United States Patent [19]

Hirschberg

[11] Patent Number: 4,560,157
[45] Date of Patent: Dec. 24, 1985

[54] TRANSPORT DEVICE FOR INDIVIDUAL SHEETS TO BE COMBINED INTO A STACK

[75] Inventor: Jakub Hirschberg, Täby, Sweden

[73] Assignee: Siemens Aktiengesellschaft, Berlin & Munich, Fed. Rep. of Germany

[21] Appl. No.: 658,460

[22] Filed: Oct. 9, 1984

Related U.S. Application Data

[63] Continuation of Ser. No. 345,341, Feb. 3, 1982, abandoned.

[30] Foreign Application Priority Data

Feb. 10, 1981 [DE] Fed. Rep. of Germany ....... 3104664

[51] Int. Cl.$^4$ .......................... B65H 1/14; B65H 29/42
[52] U.S. Cl. ..................................... 271/126; 271/113; 271/192; 271/209; 271/273; 271/179; 271/3.1; 414/37
[58] Field of Search ................ 271/113, 109, 119, 126, 271/192, 209, 273, 274, 314, 179, 3.1; 414/94, 37, 129

[56] References Cited

U.S. PATENT DOCUMENTS

| | | | |
|---|---|---|---|
| 1,951,178 | 4/1934 | Smitmans | 271/192 X |
| 3,675,791 | 7/1972 | Russell et al. | 271/192 X |
| 3,761,080 | 9/1973 | Larson | 271/88 |
| 4,362,452 | 12/1982 | Sparr | 414/37 |

Primary Examiner—Bruce H. Stoner, Jr.
Assistant Examiner—James E. Barlow
Attorney, Agent, or Firm—Hill, Van Santen, Steadman & Simpson

[57] ABSTRACT

A device for transporting individual sheets to or from a magazine housing containing the sheets in a stack, particularly useful in x-ray installations, includes a threaded rotary screw member disposed within the magazine containing the stack of sheets for raising and lowering the sheet stack within the magazine and individually handling the uppermost sheet in the stack for transport to or from the magazine. A sheet transport is also provided comprising drive rollers disposed in a lateral plane overlying the sheet stack and running rollers connected to an upper end of the rotary screw member for movement in a lateral plane directly beneath the drive rollers, such that the running rollers may be disposed between the bottom circumferential portions of the drive rollers to form a sheet transport nip between the corresponding rollers. When an individual film sheet is to be conveyed to or from the magazine housing, the running rollers are positioned beneath the drive rollers pressing the transported sheet therebetween and the drive rollers are rotated to bring about transport of the sheet.

17 Claims, 2 Drawing Figures

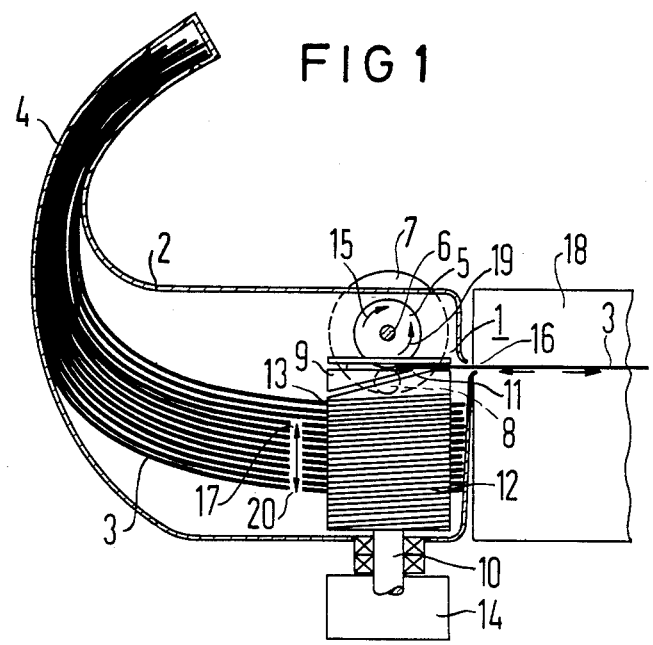
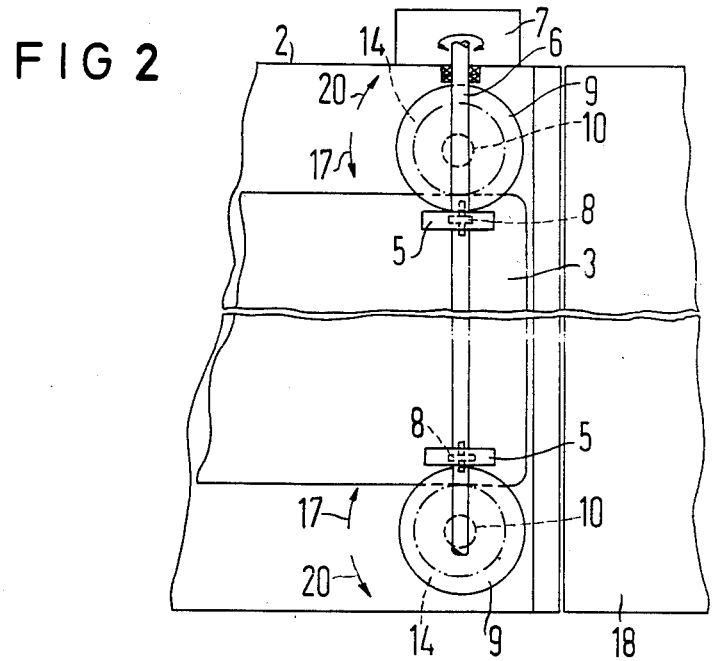

TRANSPORT DEVICE FOR INDIVIDUAL SHEETS TO BE COMBINED INTO A STACK

This is a continuation of application Ser. No. 345,341, filed Feb. 3, 1982 now abandoned.

RELATED APPLICATION

The present application relates to a commonly assigned application Ser. No. 345,242, now U.S. Pat. No. 4,447,053, entitled "Device For Separating Individual Sheets Combined Into A Stack" and filed of even date herewith.

BACKGROUND OF THE INVENTION

The invention concerns a device for handling individual sheets to and from a stack, particularly, film sheets for x-ray devices, in which each individual sheet of the stack is transferred between a lateral plane defining the top of the stack and sheet transport roller means.

A known problem in existing film exchanges, particularly in connection with x-ray installations, is the separation of individual sheets of flat film stacked in a feeder magazine in such a manner that only one sheet is transported to the exposure station of the film exchanger. Delivery of a plurality of sheets simultaneously would make an exposure impossible.

One known type of feeder magazine utilizes a sheet drive or transport means in which an upper drive roller forms a nip with a lower running lower so that the sheet conveyed to the drive roller is seized between the drive and running rollers, enabling the drive roller to pass the sheet to or from a storage housing. The running roller is intermittently swiveled into the plane of the drive roller to form the transport nip. A disadvantage of this known arrangement occurs in the rapid transporting of film sheets since when the running roller is pivoted against the drive roller it can rebound and continuity of film transport may be disrupted. Under certain circumstances, the rebound effect on the running roller can result in several film sheets being transported together. In addition, when the running roller strikes the drive roller, vibrations arise in the film exchanger device which can ultimately lead to disturbances in sensitive components, as well as possibly disrupt picture quality in the film exchanger connected to the transport device.

The present invention calls for film transport means for use in a film sheet storage mechanism that can assure the transport of individual sheets one at a time regardless of the transport velocity and avoids detrimental vibrations resulting in the drive roller.

SUMMARY OF THE INVENTION

A film sheet magazine in which individual film sheets of a stack are received or transmitted in a film exchanger installation includes at least one rotary screw device for guiding the sheets one at a time into or out of the magazine. The thread pitch of the screw (the thread pitch referring to the spacing of adjacent grooves of the screw threads) is greater than the thickness of a respective sheet in the stack. Sheet transport means are disposed in the magazine overlying the uppermost sheet of the stack. The transport means include a main drive roller disposed in one plane and a running roller disposed in a plane parallel to and beneath the first plane, with both the rollers being arranged for rotation about parallel axes. A sheet being transported to or from the stack is pressed through a nip formed between the drive roller and running roller during movement of the sheet into and out of the magazine. The running roller is mounted on a rotary member, preferably connected to or being part of the rotary screw, for movement away from the drive roller and movement to a position underlying the drive roller for formation of the transport nip. The rotary member containing the running roller rotates about a vertical axis perpendicular to the rotational axis for the drive roller, such that an improved gripping of the individual film sheet in the transport nip occurs and vibrations usually caused by rebounding of the running roller against the drive roller are avoided. In accordance with the invention, the film transport action of the rollers may be synchronized with any randomly chosen film delivery frequency.

The rotary part on which the running roller is disposed is formed with an annular thread-like groove for engaging and guiding the lateral edges of each sheet running through the transport nip formed by the rollers. Along the side of the rotary part opposite from the running roller, the groove leads into the screw threads formed on the screw member. Rotation of the screw serves to vertically conduct sheets within the magazine separated from one another in the stack by virtue of the thread pitch. Accordingly, film sheets are always individually conveyed into or out of engagement with the transport means one after another for delivery to or receipt from the film exchanger.

BRIEF DESCRIPTION OF THE DRAWING

FIG. 1 is side cross-sectional view of a sheet film magazine for a film changer having an individual sheet separating device and transport device in accordance with the present invention.

FIG. 2 is a broken-away plan view of the sheet film magazine of FIG. 1.

DESCRIPTION OF THE PREFERRED EMBODIMENT

FIGS. 1 and 2 show transport roller means 1 used for conducting individual flat film sheets to or from a magazine housing 2 in a film exchanger system, such as an x-ray installation. The individual film sheets 3 are arranged in a vertical stack one on top of the other within the housing. The housing 2 is constructed with a substantially horizontally directed first end and an opposed upwardly curved end 4 which is bent so that the film sheets 3 are fixed in a curved stack within the housing. The upwardly curved end 4 of the housing provides for a compact spatial arrangement.

The transport means 1 includes laterally spaced apart drive rollers 5 disposed for rotation about a laterally directed axle 6 which is driven by a suitable reversible rotary motor 7. The drive rollers 5 are disposed in a plane overlying the top of the sheet stack within the housing. The transport means 1 further includes a pair of running rollers 8 respectively secured to two rotary members 9 positioned laterally outward of the drive rollers 5. The rotary members 9 turn on axles 10 having vertical axes which intersect perpendicularly with the laterally disposed axle 6.

Each rotary member 9 is formed with a downwardly sloping or thread-like lateral groove 11 for receiving and guiding individual film sheets 3 upwardly for engagement with the drive rollers 5 as further described below. The groove 11 is formed of a thread pitch which corresponds to at least the diameter of the running roller 8. At that side of the rotary member 9 substantially opposed from the running roller 8, the groove 11 connects to annular screw threads 13 formed on a screw member 12 forming the lower portion of the rotary part 9. The screw 12 serves to individually separate the film sheets 3 in the stack and the threads 13 of the screw are connected substantially without interruption to the lower end of the groove 11, such that corresponding side edges of each sheet may be passed between the screw threads 13 and the groove 11 in continuous fashion. The thread pitch of the screw 12 corresponds from two up to ten times the thickness of an individual film sheet 3, but is preferably substantially less than the pitch of the groove 11. In accordance with the preferred embodiment, the rotary part 9 is a one-piece member containing the groove 11 and the screw portion 12. The rotary part 9 is connected for rotation about its vertical axis via a shaft 10 driven by a suitable reversible rotary motor 14.

The laterally spaced apart portions of the transport means 1 serve to act upon opposed sides of each film sheet during transport of the sheet to and from the magazine 2 and are synchronously operated.

As shown in the Figures, the magazine 2 is loaded with a stack of film sheets and arranged for feeding to a film exchanger 18. The magazine may alternatively be connected to a suitable loading device not shown to permit loading of the film sheets into the housing. It is intended that the magazine housing 2 be mounted so as to be removable from connection with the film exchanger 18.

During loading of the magazine housing 2, the drive rollers 5 are turned in the direction of arrow 15 at a suitable constant speed. The sheet of film 3 is then inserted into a slot-like opening 16 laterally formed along the horizontally disposed end of the magazine housing to the extent that the opposed sides of the film sheet are received and guided in the groove 11 until an upper surface portion of the sheet engages with the lower ends of the drive rollers 5. The rotary motors 14 are then switched on so that the rotary parts 9 turn about shafts 10 until the running rollers 8 are placed substantially beneath the drive rollers 5 as shown in the Figures. In this manner, the film sheet 3 is pressed within a transport nip formed between the drive rollers 5 and the running rollers 8. The motors 14 are then switched off, such that the running rollers retain this position, and the film sheet is conveyed fully into the magazine housing by virtue of rotation of the drive rollers 5 until the tail end of the sheet reaches the position within the housing as shown in FIG. 2. The motors 14 are again turned on such that the rotary members 9 along with the screws 12 are now turned in the direction of the arrows 20 and the sheet of film loaded into the housing is conducted by the grooves 11 to the beginning of the threads 13 of the screws.

When the running rollers 8 again stand beneath the drive rollers 5, a successive film sheet may have already been fed through the slot 16 in the manner of the first sheet for engagement against the lower circumferential surfaces of the drive rollers 5. Due to the rotary motion of the rotary members 9, the first sheet of film is transported downwardly within the housing along the threads 13 of the screws 12. The speed of the rotary members 9 and of the screws 12 connected thereto can thus be controlled as a function of the desired transport frequency of the film sheets 3. The process described above is repeated until the magazine 2 is filled with a completed stack.

After the magazine has been loaded, it is re-connected to the film exchanger 18. In order to conduct individual sheets of film out of the magazine housing, the loading operation is carried out in reverse sequence. The drive rollers 5 are turned in the direction of the arrows 19 at a suitable constant speed. The rotary members 9 along with the screws 12 are turned in the direction of arrows 17, so that the uppermost sheet of the stack is conveyed up to the drive rollers 5 by means of the grooves 11. The underlying sheets of the stack are simultaneously passed upward along the screw threads 13. When the running rollers 8 are substantially beneath the drive rollers 5 to form the transport nips, the uppermost film sheet is pressed in the nips between the rollers and this sheet is conveyed out of the magazine 2 through the lateral slots 16 into the film exchanger 18 for exposure. During a further rotation of the rotary members 9, the next adjacent film sheet of the stack is conveyed to the drive rollers 5 and delivered to the film exchanger in the manner described above.

After exposure in the exposure station, each film sheet is transported to a collector magazine connected to the film exchanger 18. The transfer of sheets of film 3 into the collector magazine may correspond to the operation described above in connection with the loading of the magazine 2. The collector magazine having a stack of exposed film sheets may be connected to a developing device and the sheets of film of the stack may be successively transported out of the collector magazine in accordance with the manner described above in connection with the discharge of sheets from the magazine housing 2.

Although various minor modifications may be suggested by those versed in the art, it should be understood that I wish to embody within the scope of the patent warranted herein all such modifications as reasonably and properly come within the scope of my contribution to the art.

I claim as my invention:

1. Apparatus for the movement of individual sheets of x-ray film in a transfer direction relative to a vertical stack of said sheets disposed in a housing comprising a drive roller means mounted for driven rotation about a lateral axis within a first plane overlying said stack, a runner roller freely rotatable on lateral axle means connected to a rotary member mounted for rotation about a vertical axis such that said runner roller is movable through a second plane parallel to and beneath said first plane for intermittently bringing said runner roller into nip relationship with said drive roller means, said vertical axis perpendicularly intersecting said lateral axis, means for feeding one said individual sheet into engagement with said rotating drive roller means, and drive means for turning said rotary member to position said runner roller in nip relation with said drive roller means, while said drive roller means is rotating, for pressing said individual sheet against said drive roller means in said nip and permitting transfer of said individual sheet relative to said stack due to rotation of said drive roller means, said rotary member always being rotated relative to the transfer direction of said sheets such that said runner roller moves into nip relationship with said drive roller means in the transfer direction of said sheets.

2. The apparatus of claim 1, wherein said rotary member includes a laterally sloping groove having a thread pitch at least equal to the diameter of said runner roller for receiving and guiding side edges of said individual sheet in vertical displacement relative to said stack.

3. The apparatus of claim 2, further comprising a screw underlying said rotary member mounted for driven rotation with said rotary member about said vertical axis, said screw having continuous lateral screw threads disposed beneath said groove and leading to said groove, said screw threads having a pitch greater than the thickness of each sheet and receiving side edges of said sheets in said stack for separating said stack sheets from one another such that rotation of said screw vertically displaces said stack sheets simultaneously in said housing.

4. The apparatus of claim 3, wherein said screw threads have a pitch at least two times the thickness of each sheet.

5. The apparatus of claim 3, wherein said screw and rotary member are integral.

6. The apparatus of claim 1, wherein said drive roller means are rotated at substantially constant velocity.

7. The apparatus of claim 1, wherein said drive roller means comprise two laterally spaced drive rolls synchronously operated and there are two rotary members, each having one respective runner roller connected thereto, said rotary members having their vertical axes at corresponding opposed outer lateral sides of said drive rolls.

8. The apparatus of claim 1, wherein said housing is of curved cross-section such that said stack is bent in said housing.

9. The apparatus of claim 8, wherein said drive roller means are adjacent a lead end of said housing having a laterally directed opening for receiving individual sheets therethrough to and from said transport roller means, the opposed tail end of said housing being tapered in a curved shape.

10. Apparatus for the transfer of individual sheets relative to a vertical stack of said sheets disposed in a housing comprising a drive roller means mounted for driven rotation about a lateral axis within a first plane overlying said stack, a runner roller freely rotatable on lateral axle means connected to a rotary member mounted for rotation about a vertical axis such that said runner roller is movable through a second plane parallel to and beneath said first plane for intermittently bringing said runner roller into nip relationship with said drive roller means, means for feeding one said individual sheet into engagement with said drive roller means for pressing said individual sheet against said drive roller means in said nip and permitting transfer of said individual sheet relative to said stack due to rotation of said drive roller means, wherein said rotary member includes a laterally sloping groove having a thread pitch at least equal to the diameter of said runner roller for receiving and guiding side edges of said individual sheet in vertical displacement relative to said stack.

11. The apparatus of claim 10, further comprising a screw underlying said rotary member mounted for driven rotation with said rotary member about said vertical axis, said screw having continuous lateral screw threads disposed beneath said groove and leading to said groove, said screw threads having a pitch greater than the thickness of each sheet and receiving side edges of said sheets in said stack for separating said stack sheets from one another such that rotation of said screw vertically displaces said stack sheets simultaneously in said housing.

12. The apparatus of claim 11, wherein said screw threads have a pitch at least two times the thickness of each sheet.

13. The apparatus of claim 11, wherein said screw and rotary member are integral.

14. The apparatus of claim 10, wherein said drive roller means comprise two laterally spaced drive rolls synchronously operated and there are two rotary members, each having one respective runner roller connected thereto, said rotary members having their vertical axes at corresponding opposed outer lateral sides of said drive rolls.

15. The apparatus of claim 10, wherein said housing is of curved cross-section such that said stack is bent in said housing.

16. The apparatus of claim 15, wherein said drive roller means are adjacent a lead end of said housing having a laterally directed opening for receiving individual sheets therethrough to and from said transport roller means, the opposed tail end of said housing being tapered in a curved shape.

17. The apparatus of claim 1, wherein said drive roller means and rotary member are mounted for reversible driven rotation for feed or delivery of individual sheets to or from said vertical stack.

* * * * *